(12) United States Patent
Nakagawa et al.

(10) Patent No.: US 8,666,435 B2
(45) Date of Patent: Mar. 4, 2014

(54) COMMUNICATION CONTROLLER, COMMUNICATION CONTROL METHOD AND RADIO COMMUNICATION SYSTEM

(75) Inventors: Takao Nakagawa, Kawasaki (JP); Hiroyuki Seki, Kawasaki (JP); Masaru Takenaka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 13/409,772

(22) Filed: Mar. 1, 2012

(65) Prior Publication Data

US 2012/0238297 A1    Sep. 20, 2012

(30) Foreign Application Priority Data

Mar. 16, 2011    (JP) .................................. 2011-058287

(51) Int. Cl.
*H04W 24/00*    (2009.01)
(52) U.S. Cl.
USPC .................. 455/456.5; 455/452.1; 455/452.2; 455/450; 455/456.1

(58) Field of Classification Search
USPC .............. 455/436, 440, 441, 450, 452.1, 455, 455/456.1, 456.3
See application file for complete search history.

(56) References Cited

U.S. PATENT DOCUMENTS

2010/0085923 A1*    4/2010    Nyberg et al. ................ 370/329

FOREIGN PATENT DOCUMENTS

| JP | A2003-188802 | 7/2003 |
| JP | 2004-212177 | 7/2004 |
| JP | A2008-199381 | 8/2008 |
| JP | 2008-236381 | 10/2008 |
| JP | A2010-226668 | 10/2010 |

* cited by examiner

*Primary Examiner* — Kathy Wang-Hurst
(74) *Attorney, Agent, or Firm* — Fujitsu Patent Center

(57) ABSTRACT

A communication controller includes a processor. The processor performs a process of estimating a moving route of a mobile station connected through a network and a process of determining a timing to start transmission of data to be transmitted between the network and the mobile station based on a prediction result of a communication quality of the mobile station according to the estimated moving route and a size of the data.

10 Claims, 14 Drawing Sheets

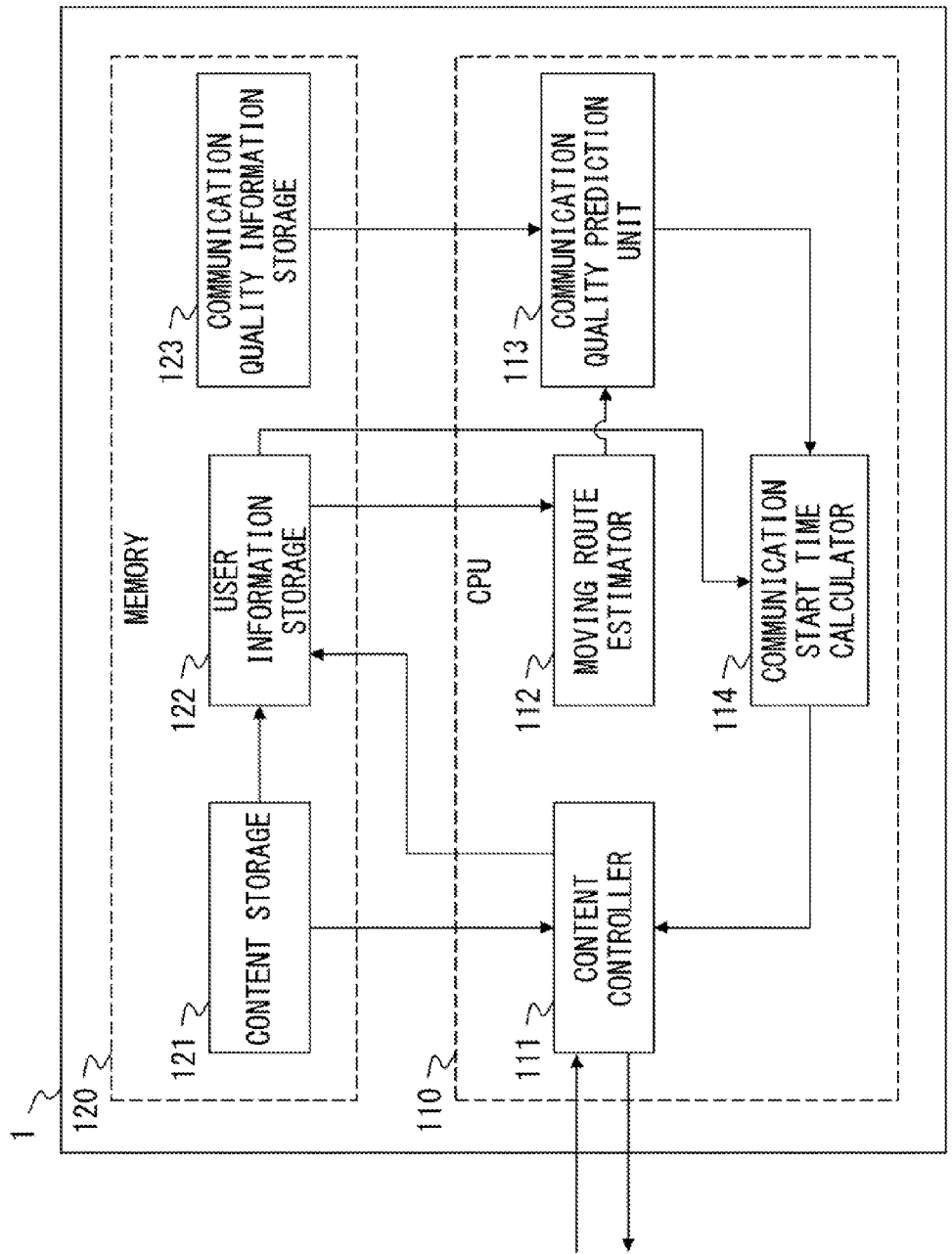
F I G. 2

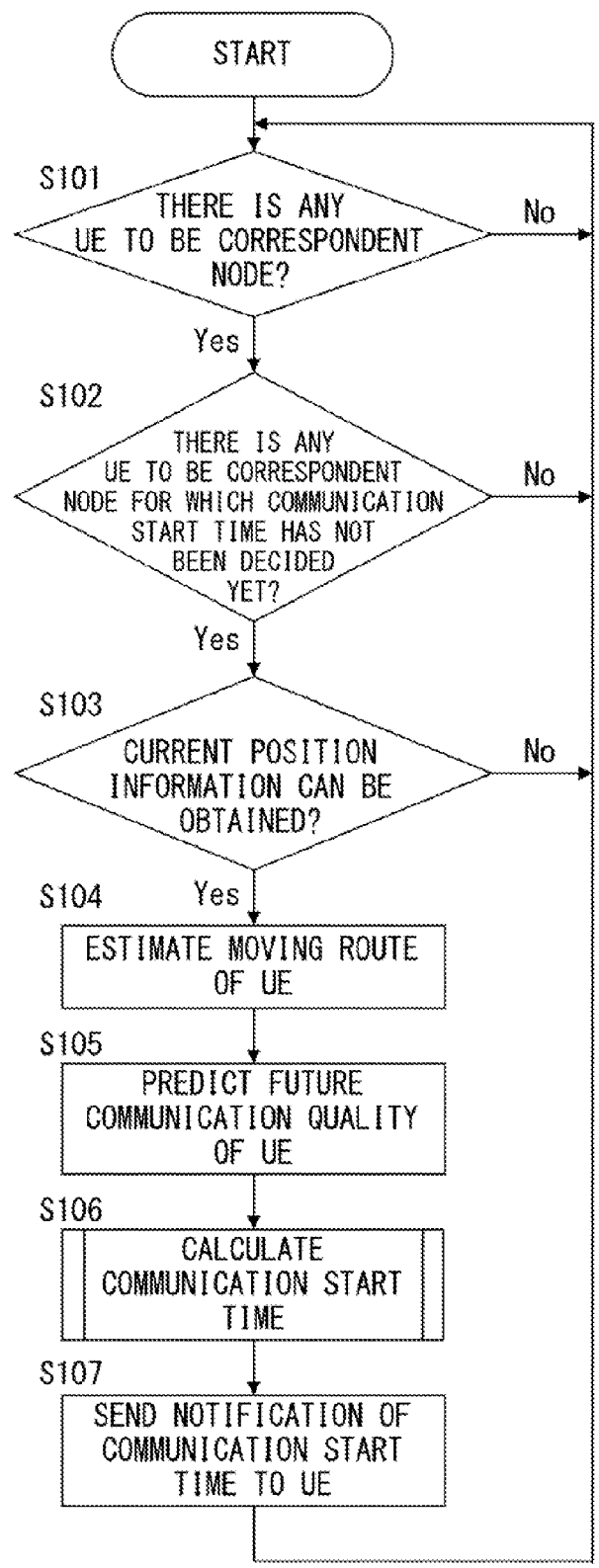
F I G. 4

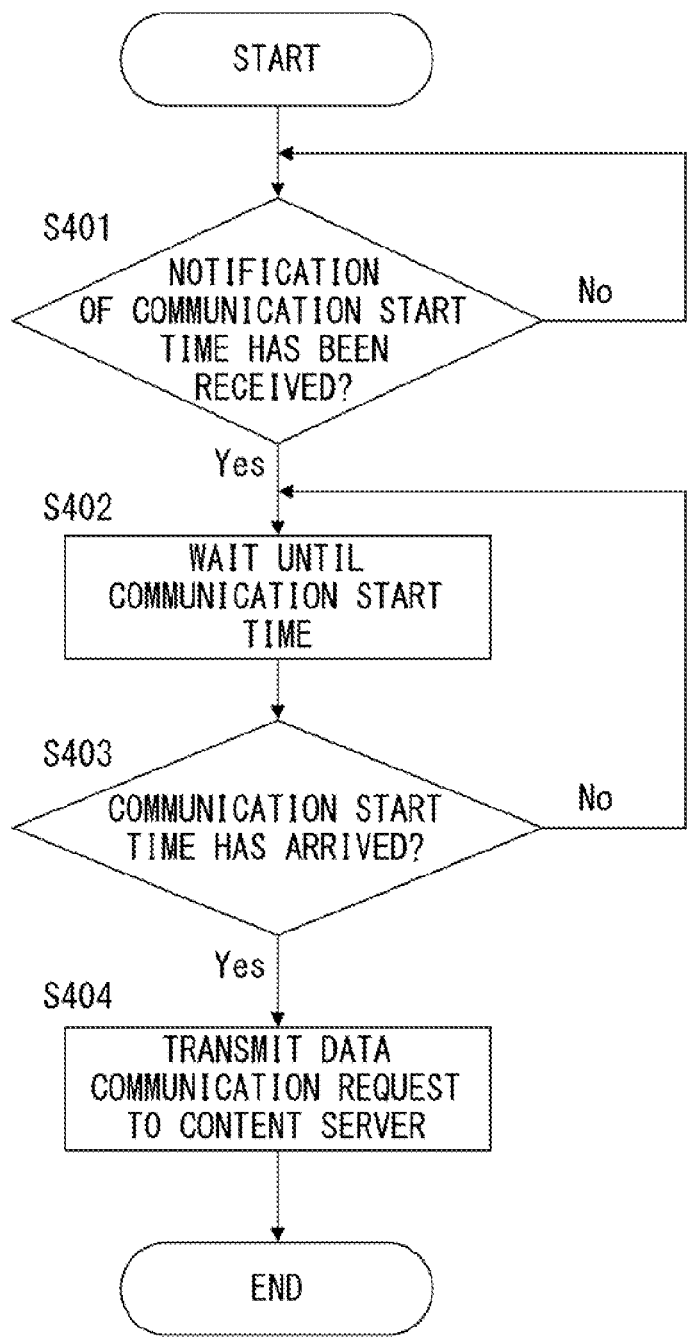
F I G. 7

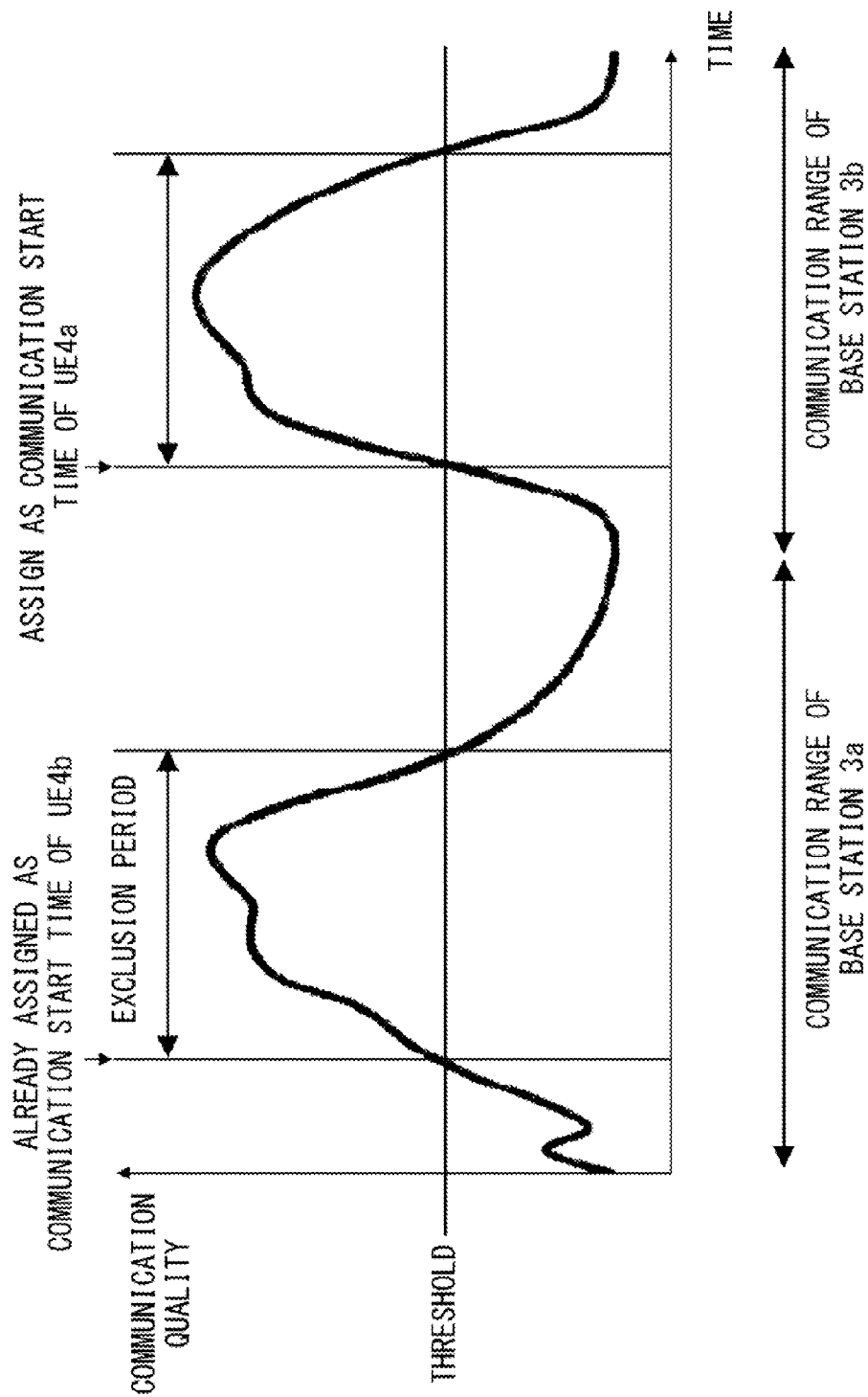
F I G. 13

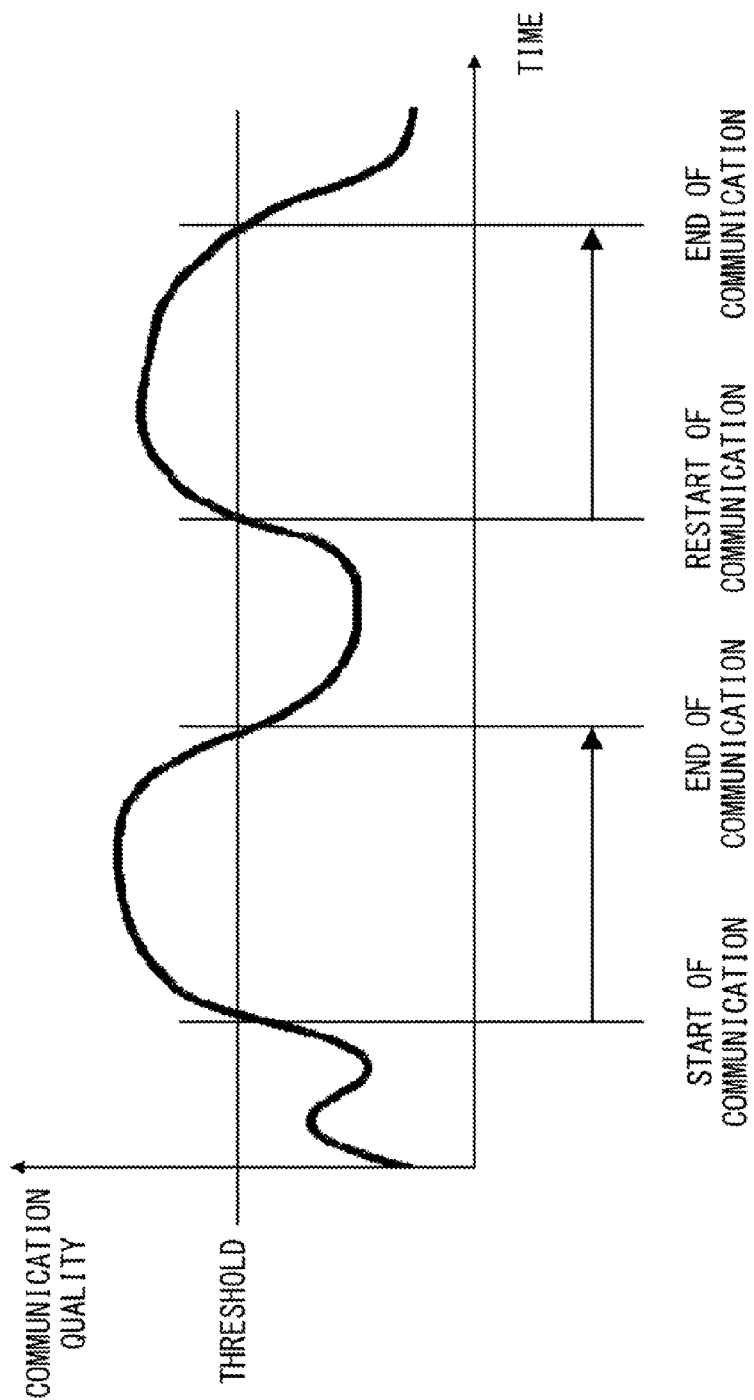
F I G. 14

COMMUNICATION CONTROLLER, COMMUNICATION CONTROL METHOD AND RADIO COMMUNICATION SYSTEM

CROSS-REFERENCE TO RELATED APPLICATION

This application is based upon and claims the benefit of priority of the prior Japanese Patent Application No. 2011-058287, filed on Mar. 16, 2011, the entire contents of which are incorporated herein by reference.

FIELD

The embodiments described in this application is related to a radio communication system to perform radio communication between a network and a mobile station via a radio base station, and a communication controller and communication control method of the radio communication system.

BACKGROUND

In the radio communication system, a mobile station may move within a cell or between cells of a radio base station, causing change in the communication quality according to the move of the mobile station and the passing of time. It has been known that, in connection with change in the communication quality, for example, a rapid deterioration in the communication quality causes technical problems such as a decrease in the data transmission efficiency and sometimes disconnection of transmission.

As a solution for such problems, in order to maintain preferable communication, a method to predict change in the communication quality based on an estimated moving route of the mobile station and to realize efficient communication is studied. Related techniques are disclosed in Japanese Laid-open Patent Publication No. 2008-236381 and Japanese Laid-open Patent Publication No. 2008-199381.

However, the conventional techniques have following problems.
(1) Even if an area in which efficient communication can be performed is selected from an estimated moving route, the area may be far away from the current position of the mobile station. In such a case, since the use would be kept waiting for a long time before the start of data transmission/reception, it is not convenient enough.
(2) Since change in the communication quality within a cell cannot be handled, efficient communication may not necessarily be realized.
(3) In the state where the communication quality is bad, since the data transmission rate is set low and the transmission interval is set long, completion of data transmission requires a long time. In this case, the radio resource of the base station is occupied for a long period of time, thus the radio resource is not used efficiently and it is inconvenient for the user.

SUMMARY

According to an aspect of the invention, a communication controller includes a processor to perform a process of estimating a moving route of a mobile station connected through a network and a process of determining a timing to start transmission of data to be transmitted between the network and the mobile station based on a prediction result of a communication quality of the mobile station according to the estimated moving route and a size of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a block diagram illustrating the configuration of a content server.

FIG. 4 is a flowchart presenting the operation of a content server.

FIG. 7 is a flowchart presenting a process of a UE that receives a notification of the communication start time.

FIG. 13 illustrates an example of the communication quality in a UE to explain the fifth embodiment.

FIG. 14 illustrates an example of the communication quality in a UE to explain the sixth embodiment.

DESCRIPTION OF EMBODIMENTS

Configuration Example

Figure 1:
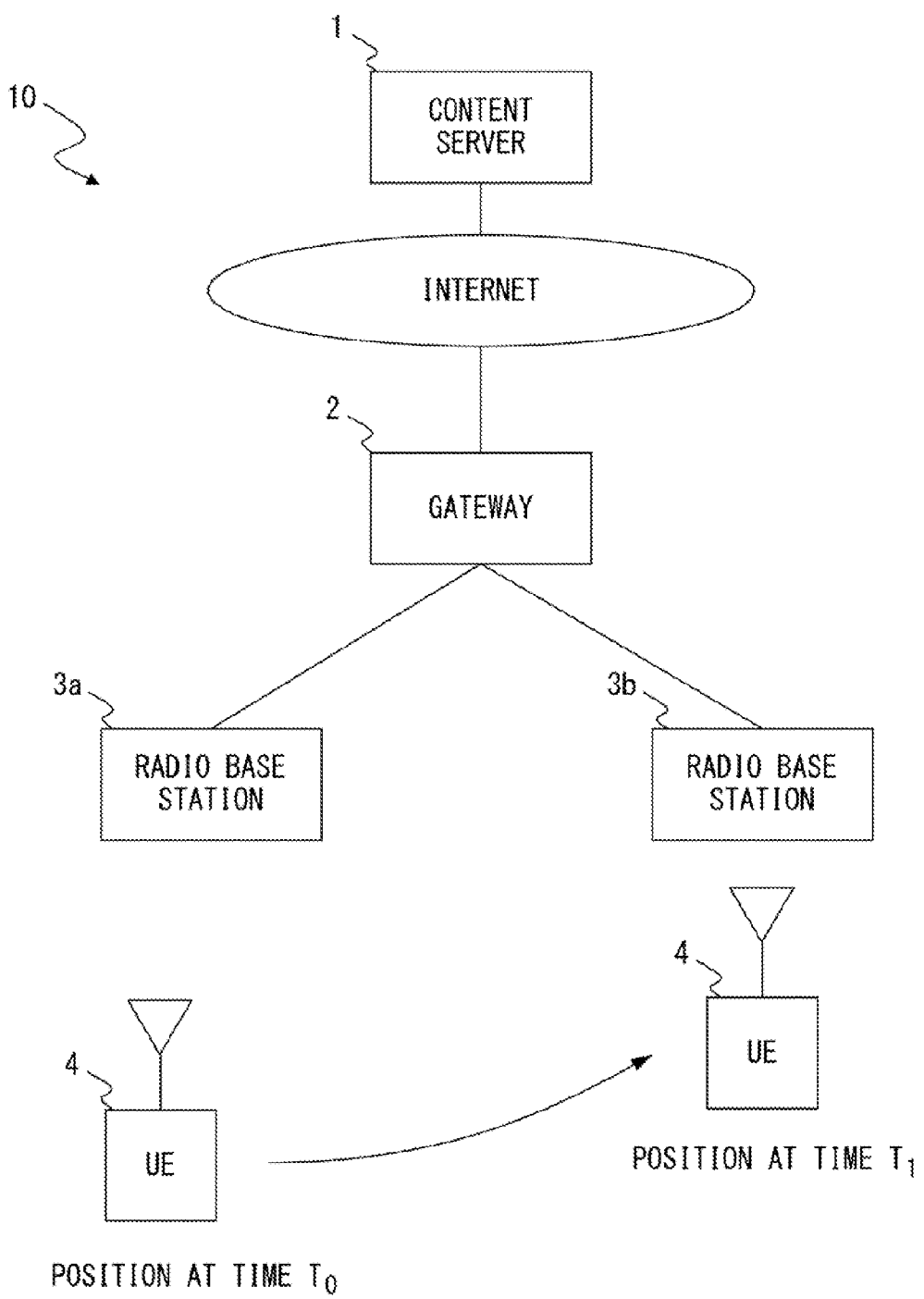
FIG. 1 is a block diagram illustrating the configuration of a radio communication system.

A configuration example of a communication controller and a radio communication system controlled by the communication controller is described with reference to FIG. 1. FIG. 1 is a block diagram illustrating the configuration of a radio communication system 10 that has a content server 1 being an example of the communication controller.

The radio communication system 10 has the content server 1, a gateway 2, radio base stations 3a and 3b, and a UE (User Equipment) 4.

The content server 1 is server for content distribution that performs services of distribution of content data such as website pages, news information, music or videos via a network such as the Internet. The content server 1 is able to regularly perform control of transmission/reception of information and the transmission/reception timing in the daily behavior of the user of the UE 4. The content server 1 is connected to the gateway 2 via the Internet.

The gateway 2 is a network device that relays communication between the content server 1 and the radio base stations 3a and 3b.

The radio base stations 3a and 3b respectively provide a cell by transmitting radio wave and perform data transmission/reception with the UE 4 that is in the service area of the cell. Meanwhile, while radio base stations 3a and 3b are illustrated in FIG. 1, the radio communication system 10 may be equipped with more radio base stations. In the description below, if the radio base stations 3a and 3b are to be described without distinction between each other, they are described as the radio base station 3.

The UE 4 is able to perform data transmission/reception with the content server 1 via the radio base station 3 when it is located in the cell of the base station 3. The UE 4 is movable as needed, and the radio base station 3 with which the UE 4 communicates changes according to its position (in other words, according to the time and the moving route). For example, in the example in FIG. 1, the UE 4 is located in the cell of the radio base station 3a at the time $T_0$, moves towards the direction of the radio base station 3b, and is located in the cell of the radio base station 3b at the time $T_1$. The communication quality in the UE 4 changes according to the movement.

The UE 4 regularly transmits position information to the content server 1. Meanwhile, while only one UE 4 is illustrated in FIG. 1, the radio communication system 1 may include more UEs 4.

A detail configuration example of the content server 1 is described with reference to FIG. 2. FIG. 2 is a block diagram illustrating the configuration of the content server 1. FIG. 2 illustrates hardware that the content server 1 has, and examples of functional units that illustrate the functions that the content server 1 has.

The content server 1 has a CPU 110 and a memory 120. The CPU 110 is a Central Processing Unit that controls the process of the content server 1. The CPU 110 can provide a content controller 111, a moving route estimator 112, a communication quality prediction unit 113, and a communication start time calculator 114. The memory 120, that is a recording device for data storage, provides a content storage 121, an user information storage 122, and a communication quality information storage 123 that are capable of storing corresponding data, respectively. Specifically, the content storage 121 stores content data to be transmitted to the UE 4. The user information storage 122 stores position information about the current position and the destination of the UE 4 transmitted from the UE 4, and user information such as the data size of the content to which a transmission request has been made. The communication quality information storage 123 holds radio quality information according to the position for each cell of the radio base station 3 in the radio communication system 10.

The communication quality information storage 123 may obtain radio quality information according to the position regarding each cell of the radio base station 3 in the radio communication system 10 by certain known or unknown method. For example, the communication quality information storage 123 may obtain communication quality information by accumulating the communication quality that UE 4 included in the radio communication system 10 or the operator and the like of the administration side actually measured with respect to the measured position. In addition, communication quality corresponding to position information may be calculated based on the position of each radio base station 3, the antenna height, the antenna angle, the transmission/reception power, geographic information within the cell (for example, information related to the altitude, shield, and the like).

The content controller 111 controls data transmission/reception with the UE 4. Specifically, according to the data transmission request from the UE 4, the content controller 111 controls transmission of content data stored in the content storage 121. In addition, the content controller 111 obtains current position information that is regularly transmitted from the UE 4 and the destination information transmitted from the UE 4. The obtained current position information and destination information are stored in the user information storage 122. In addition, the content controller 111 obtains information for deciding data size for content data for which a transmission request has been made by the UE 4, and stores it in the user information storage 122.

It is assumed that the destination information of the UE 4 and content data for which a transmission request has been made is determined in advance by the user or previous setting. For example, by accumulation of the daily movement history of the user of the UE4, registration of content data distribution service and the like, the content server 1 may obtain position information of the destination from the current position information of the UE4 after a certain time (for example, N hours later), content data to be transmitted, an estimated moving route and the like. Meanwhile, the content server 1 may obtain destination information of the user and information of content data to be transmitted by certain known or unknown method. In this description, details for the embodiment of information acquisition are omitted.

The moving route estimator 112 estimates the moving route of the UE 4 based on the current position information and the destination information for the UE 4 stored in the user information storage 122. The moving route estimator 112 may be realized by known method. For example, a method to select the shortest route to the desired destination may be used.

The communication quality prediction unit 113 predicts the future communication quality based on the moving route of the UE 4 estimated by the moving route estimator 112. Specifically, the communication quality in the moving route to the destination (in other words, until N hours later) is predicted by obtaining radio quality information corresponding to position information stored in the communication quality information storage 123 and by applying the moving route of the UE 4 to the radio quality information.

The communication start time calculator 113 calculates the communication start time in starting communication such as transmission of content data to the UE 4 and the like, in response to input of information of predicted future communication quality of the UE 4. The embodiment of the calculation of the communication start time is to be described in detail later. The calculated communication start time is fed to the content controller 111.

The content controller 111 sends a notification of the calculated communication start time to the UE 4, or start transmission of content data to the UE 4 according to the calculated communication start time.

Figure 3:
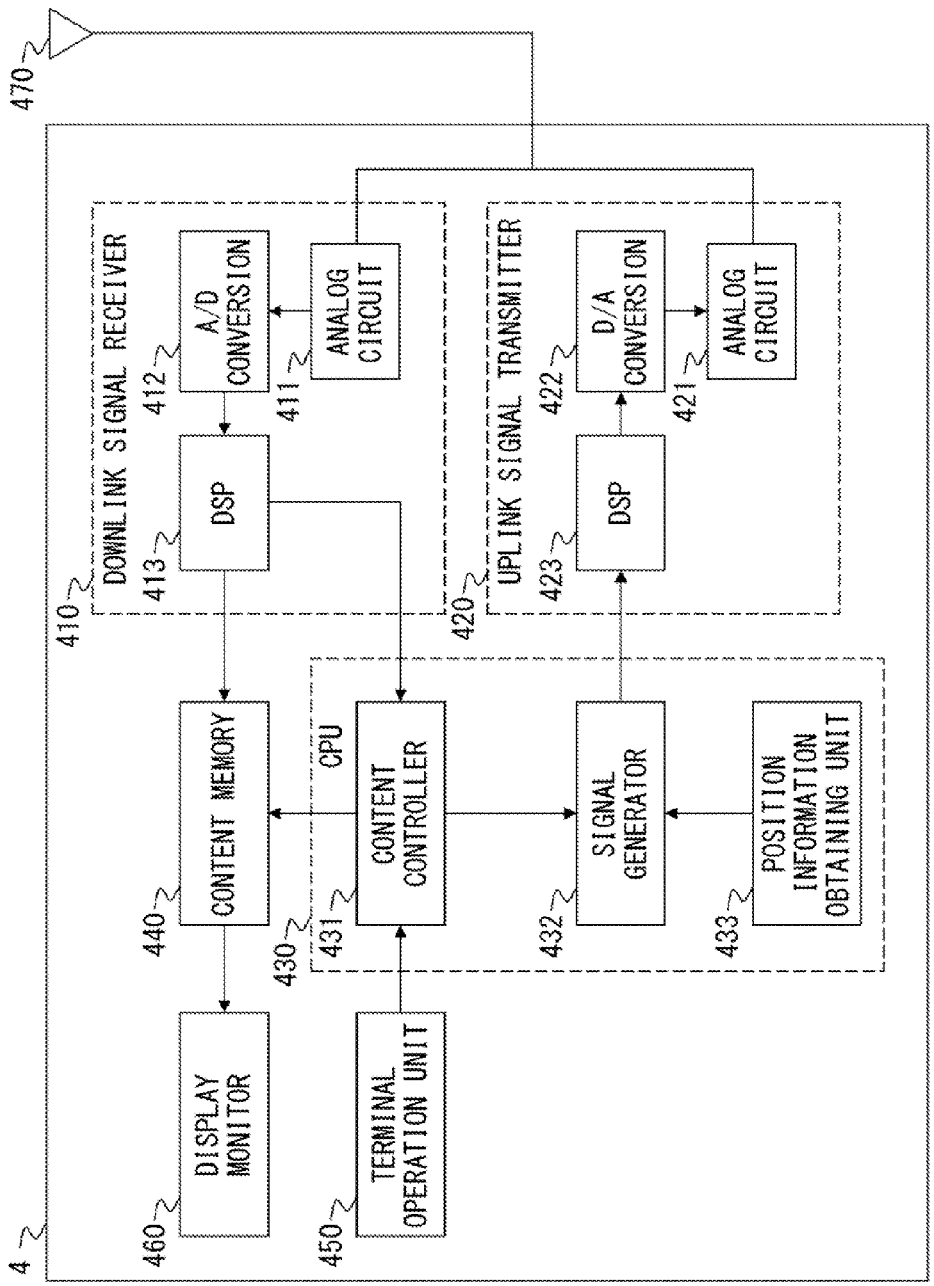
FIG. 3 is a block diagram illustrating the configuration of a UE.

Next, in reference to FIG. 3, a detail configuration example of the UE 4 is described. FIG. 3 is a block diagram illustrating the configuration of the UE 4. FIG. 3 illustrates the example of hardware that the UE 4 has, and functional units that illustrate the functions that the UE 4 has.

The UE 4 has a downlink signal receiver 410, an uplink signal transmitter 420, a CPU 430, a content memory 440, a terminal operation unit 450, a display monitor 460 and an antenna 470.

The downlink signal receiver 410 has an analog circuit 411, A/D (Analog to Digital) conversion circuit 412, and a DSP (Digital Signal Processor) 413. The downlink signal receiver 410 performs downconversion of a downlink signal received via the antenna 470, performs conversion from the analog signal into a digital signal and performs demodulation and decoding processes to recover data. The recovered data is stored in the content memory 440.

The uplink signal transmitter 420 has an analog circuit 421, a D/A (Digital to Analog) conversion circuit 422, and a DSP 423. The uplink signal transmitter 420 receives a signal generated by a signal generator 432, performs conversion from the digital signal into an analog signal after performing encoding and modulation processes. Then the uplink signal transmitter 420 transmits the amplified and upconverted signal to the base station 3 via the antenna 470. Among signals transmitted to the base station 3, the signal for the content server 1 is directed to the content server 1 via the gateway 2 and the network.

The CPU 430 is a central processing unit that controls the operation of each element of the UE 4, and performs output/input of a signal with each element. The CPU 430 has the content controller 431, the signal generator 432, and a position information obtaining unit 433.

The content controller 431 generates information to request transmission of content data from the content server 1 according to an instruction from the user input via a terminal operation unit 450, and sends the information to the signal generator 432. The terminal operation unit 450 is an information input apparatus such as the keyboard and button, touch panel and the like provided in the UE 4.

The signal generator 432 converts information input from the content controller 431 or the position information obtaining unit 433 into a signal, and sends the signal to the uplink signal transmitter 420. The uplink signal transmitter 420 transmits the signal as an uplink signal to the content server 1 via the antenna 470.

The position information obtaining unit 433 includes a GPS (Global Positioning System) receiver and the like for example. The position information obtaining unit 433 obtains the current position information of the UE 4 periodically or at a specified timing, and sends the obtained information to the signal generator 432.

The content controller 431 controls the operation of the display monitor 460 so as to display the content stored in the content memory 440 according to an instruction from the user input via the terminal operator 450. The content monitor 460 is a display device such as a display provided in the UE 4.

The content controller 431 stores information indicating the communication start time received from the content server 1 in the content memory 440. When the communication start time arrives, the position information obtaining unit 433 performs a process to transmit the communication request to the content server 1.

The content memory 440 is an information storage device such as a hard disk drive and a memory and the like. For example, content data transmitted from the content server 1 is stored in the content memory 440 via the downlink signal receiver 410.

First Embodiment

Figure 5:
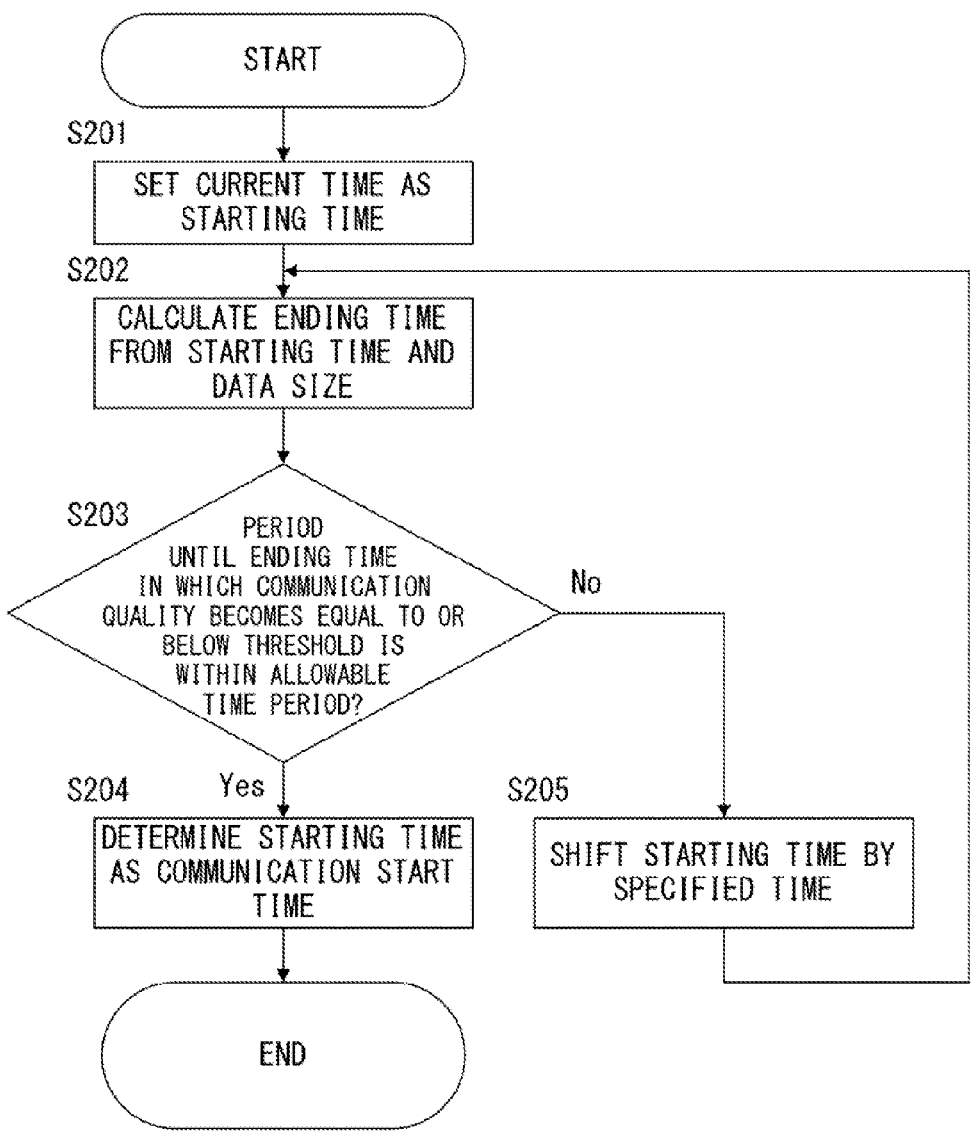
FIG. 5 is a flowchart presenting a calculation process of the communication start time.
Figure 6:
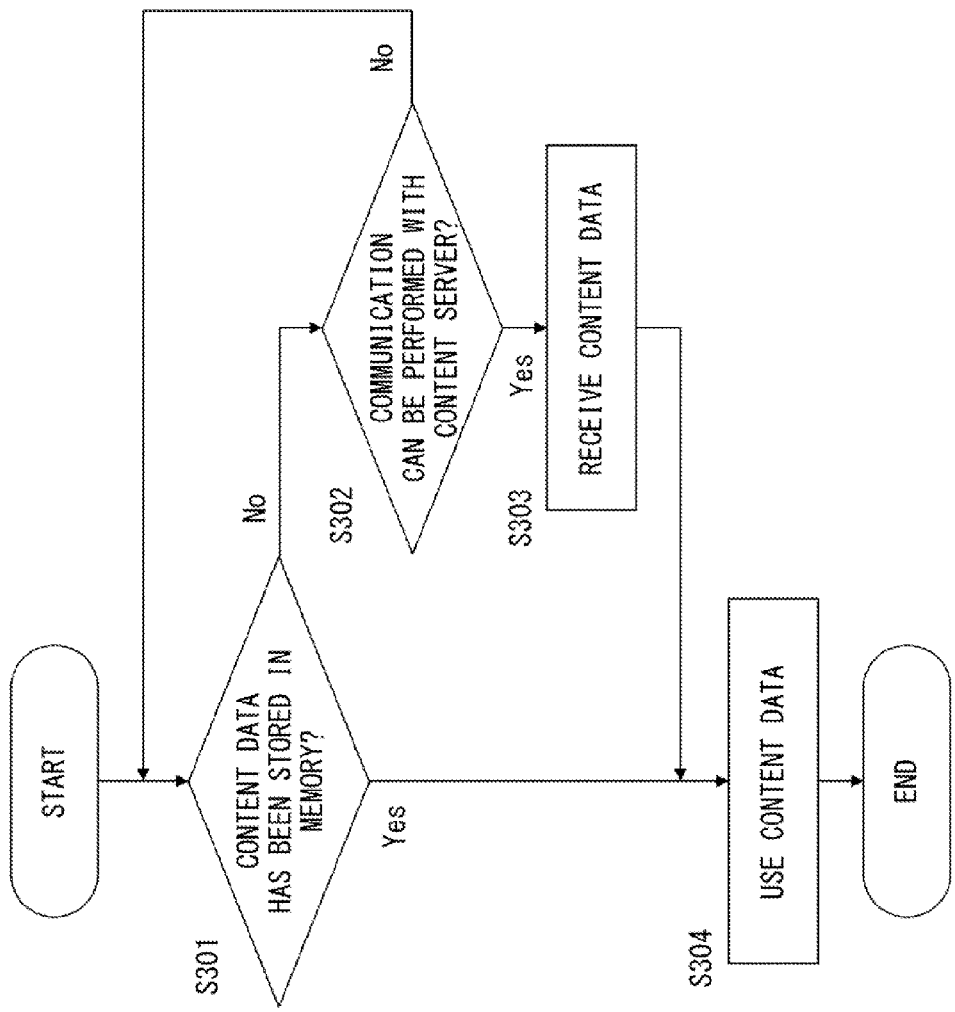
FIG. 6 is a flowchart presenting the use of content data in a UE.
Figure 8:
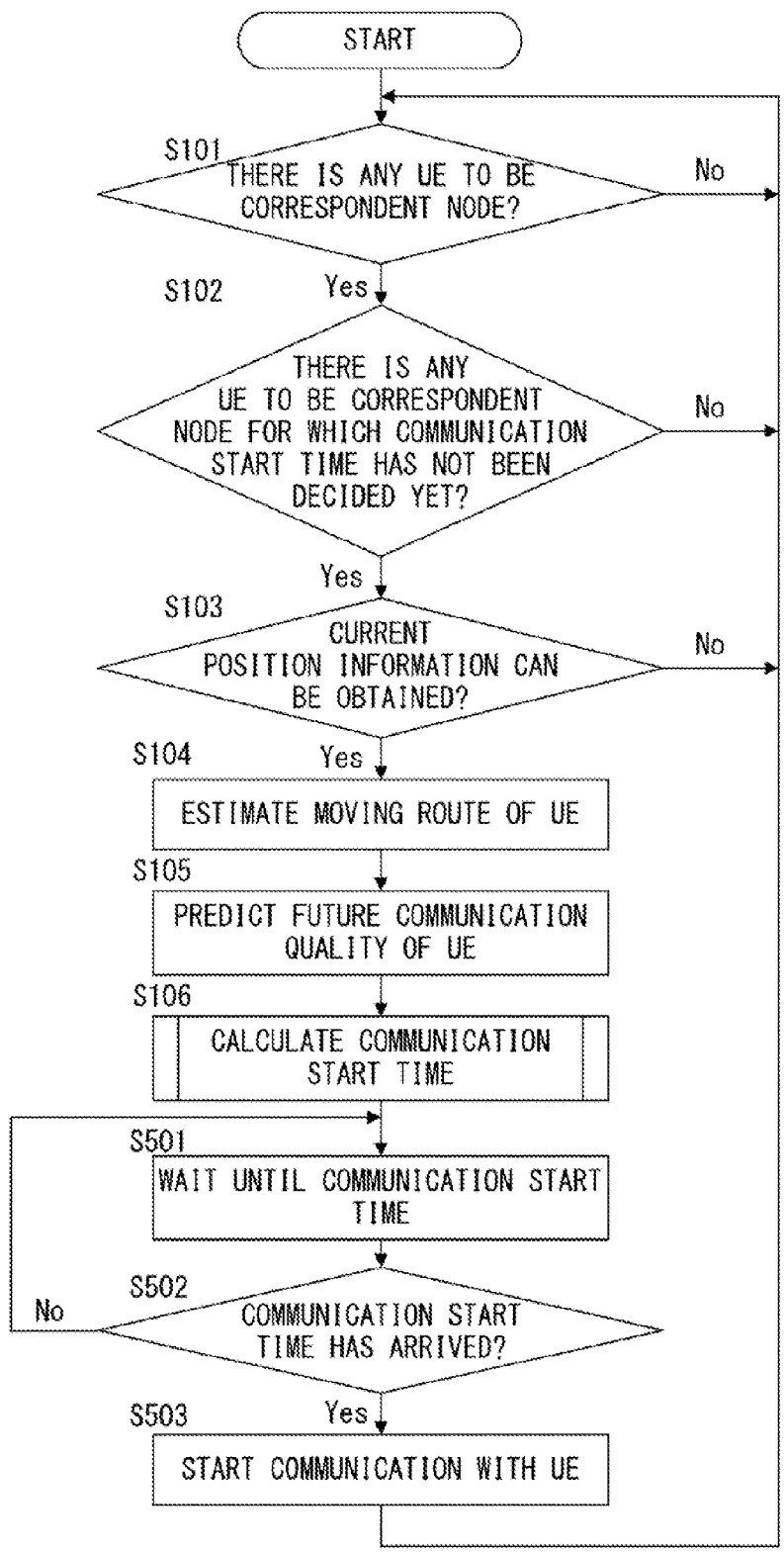
FIG. 8 is a flowchart presenting another example of the operation of a content server.

The operation of the content server 1 and the UE 4 in the radio communication system 10 is described with reference to FIG. 4-FIG. 8. Each of FIG. 4-FIG. 8 is a flowchart presenting the flow of the content server 1 or the UE 4 in the radio communication system 10. FIG. 4 presents the flow of the operation of the content server 1. FIG. 5 presents the flow of the calculation process of the communication time by the communication start time calculator 114 of the content server 1. FIG. 6 presents the flow of use of content data in the UE 4. FIG. 7 presents the flow of the operation of the UE 4 that receives the notification of the communication start time. FIG. 8 presents another example of operation of the content server 1.

The flow of the operation of the content server 1 up to the decision of the communications start time is described with reference to FIG. 4.

The content server 1 judges whether or not there is any UE 4 that is to be a correspondent node to transmit content data, in a specified period with the current time being the starting point $T_0$ (for example, from $T_0$ to $T_1$), as needed (step S101). For example, by refereeing to a subscriber list of the service that performs distribution of content data for example, the content server 1 checks whether or not there is any UE 4 to be the correspondent node within the period. $T_1$ indicates a specified time used in the calculation of the communication start time by the communication start time calculator 114 of the content server 1. The period from $T_0$ to $T_1$ may be set as needed according to the type and transmission interval of content data to be transmitted, or as desired by the user, and so on.

When there is no UE 4 to be the correspondent node (steps 101: No), the content server 1 performs the judgment in step S101 regularly without performing any special process.

When there is one or plurality of UE 4 to be the correspondent node (step S101: Yes), the content server 1 judges whether or not there is one for which the communication start time has not been decided among the UE 4 to be the correspondent node (step S102). When the communication start time has already been decided for all the UE 4 to be the correspondent node (step S102: No), since the content server 1 does not need to do new calculation, it performs the judgment in step S101 regularly without performing any special process.

When there is anyone for which the communication start time has not been decided among the UE 4 to be the correspondent node (step S102: Yes), the content server 1 judges whether or not the current position information regarding the corresponding UE 4 can be obtained (step S103). When the current position information for the UE 4 cannot be obtained (step S103: No), the content server 1 does not perform the calculation of the communication start time for the UE 4.

When the current position information for the UE 4 is obtained (step S103: Yes), the moving route estimator 112 of the content server 1 estimates the moving route of the UE 4 up to time $T_1$ (step S104).

The communication quality prediction unit 113 of the content server 1 predicts the communication quality of the UE 4 until time $T_1$ based on the estimation result of the moving route and information stored in the communication quality information storage 123 (step S105).

The communication start time calculator 114 of the content server 1 calculates the communication start time that enables preferable communication of content data, based on the prediction result of the communication quality of the UE 4 until time $T_1$ (step S106). The calculation of the communication start time is described later. The content controller 111 sends a notification of the calculated communication start time to the UE 4 (step S107).

The flow of the calculation of the communication start time by the communication start time calculator 114 of the content server 1 is described with reference to FIG. 5.

First, a tentative (in other words, for the purpose of calculation) communication start time to be used for calculating the communication start time is defined as the "starting time", and the current time is set as the starting time (step S201).

Next, with the starting time and the data size that is going to be transmitted to the UE 4 as parameters, a tentative (in other words, for the purpose of calculation) communication finish time is calculated, based on the communication quality prediction result. In this process, the tentative communication finish time is defined as the "ending time" (step S202). Through steps S201 and S202, the communication finish time in a case where communication with the UE 4 is started at current time is calculated.

Next, in the prediction result of the communication quality of the UE 4 until time $T_1$, a time period in which the communication quality becomes equal to or lower than a specified threshold is searched in the period between the starting time and the ending time. Then the communication start time calculator 114 compares the obtained time period with an allowable time period set in advance (step S203).

Here, threshold is determined for judging if the communication quality in the UE 4 is appropriate for transmission of content data.

The allowable time period is determined, for example, in such a manner that "if the time period in which the communication quality at the UE 4 is lower than the threshold is shorter than the "allowable time period", then transmission of the content data can be appropriately completed". The allowable time period may be set as needed according to the data size that is going to be transmitted. Specifically, a longer allowable time period is set for a larger data size. In the period during the communication for the content data, the communication quality in the UE 4 does not always have to be equal to or higher than the threshold. Transmission of content data can be performed, if the time period in which the communication quality at the UE 4 is lower than the threshold is shorter than the "allowable time period".

In the time period from the starting time to the ending time set as described above, if the time period in which the communication quality is lower than the threshold is shorter than the allowable time period (step S203: Yes), the starting time is decided as the communication start time, and the calculation of the communication start time is completed (step S204).

On the other hand, when the time period in which the communication quality is lower than the threshold is longer than the allowable time period (step S203: No), if the starting time currently set is applied to the communication start time, transmission of the content data cannot be performed preferably. Therefore, the communication start time calculator 114 shifts the starting time in the future direction by an arbitrary amount (step S205), and process is returned to step S202.

Until the calculation of the communication start time (step S204) is completed, the communication start time calculator 114 performs the processes from step S202 to step S205 repeatedly.

Figure 9:
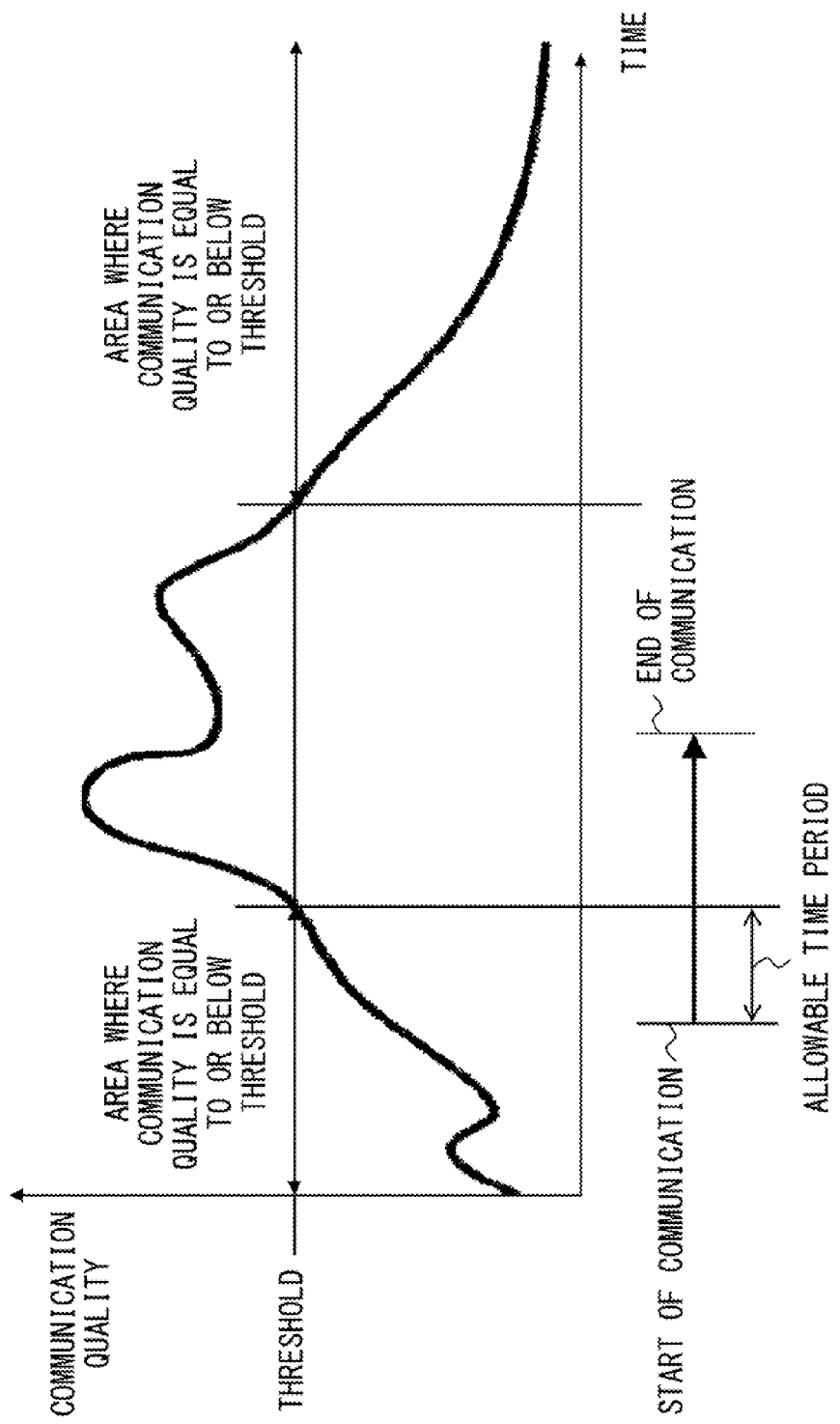
FIG. 9 illustrates an example of the communication quality in a UE to explain the first embodiment.

FIG. 9 illustrates the communication quality in the UE 4 in relation to the calculation process of the communication start time. In the example in FIG. 9, the period between the communication start time and the time at which the communication quality in the UE 4 becomes higher than the threshold has the length corresponding to the allowable time period. Thus, the since the time period in which the communication quality in the UE 4 falls below the threshold is within the allowable time period, the start of communication illustrated in FIG. 9 may be set as the communication start time.

The flow of the operation in which the UE 4 uses the content data is illustrated with reference to FIG. 6. First, the UE4 judges, upon using content data, whether desired content data is stored in the content memory 440 (step S301). When the desired content data has already been stored in the content memory 440, the UE 4 uses the content data (step S304).

On the other hand, when the desired content data has not been stored in the content memory 440 yet (step S301: No), the UE 4 next judges whether or not communication with the content server 1 can be performed (step S302). When communication can be performed, the UE 4 receives the content data from the content server 1 (step S303). When communication with the content server 1 cannot be performed (step S302, No), the process is tentatively terminated, and after a certain period of time has passed, the UE 4 checks the storage status of content data in the content memory 440 (step S301).

The flow of operation in the UE 4 that receives notification of the communication start time is described with reference to FIG. 7.

As illustrated in FIG. 7, after receiving notification of the communication start time (step S401: Yes), the UE 4 waits until the specified communication start time (step S402). After that, when the communication start time arrives (step S403: Yes), the UE 4 transmits a transmission request of the content data to the content server 1 (step S404). Note that step S402 may be omitted.

Meanwhile, in a case in which content data is transmitted from the content server 1 without the transmission request, the UE 4 only needs to receive the transmitted content data. The flow in a modification example of the operation of the content server 1 corresponding to such an operation is described with reference to FIG. 8.

In this modification example, from the judgment operation of whether or not there is any UE 4 to be the correspondent node (step S101) to the calculation operation of the communication start time (step S106) is substantially the same as in the operation example illustrated in FIG. 4 described above.

In the modification example, after the calculation of the communication start time, the content server 1 waits until the calculated communication start time (step S501). After that, when the communication start time arrives (step S502: Yes), the content server 1 starts communication with the UE 4 such as transmission of content data (step S503). Specifically, in the case of downlink communication, the content server 1 transmits the content data to the UE 4 on the communication start time. In the case of uplink communication, the content server 1 transmits a transmission request of data to the UE 4 on the communication start time. Note that step S501 may be omitted.

According to the operation of the content server 1 in the modification example, the process to send notification of the communication start time to the UE 4 may be omitted, and it is beneficial in terms of reducing unnecessary traffic.

According to the first embodiment, communication is performed in a period in which the communication time with the UE 4 can be reduced in each of the radio base station 3 in the radio communication system 10. For this reason, the occupation period of the radio resource in the radio based station 3 in the communication with the UE 4 may be reduced, making it possible to realize more efficient radio resource. Meanwhile, since content data may be transmitted/received at a timing as close as possible to the current time, convenience for the user is not impaired. Furthermore, since the communication efficiency improves, the communication time regarding transmission/reception of content data is reduced, the power consumed by the UE 4 for communication is suppressed.

Second Embodiment

Figure 10:
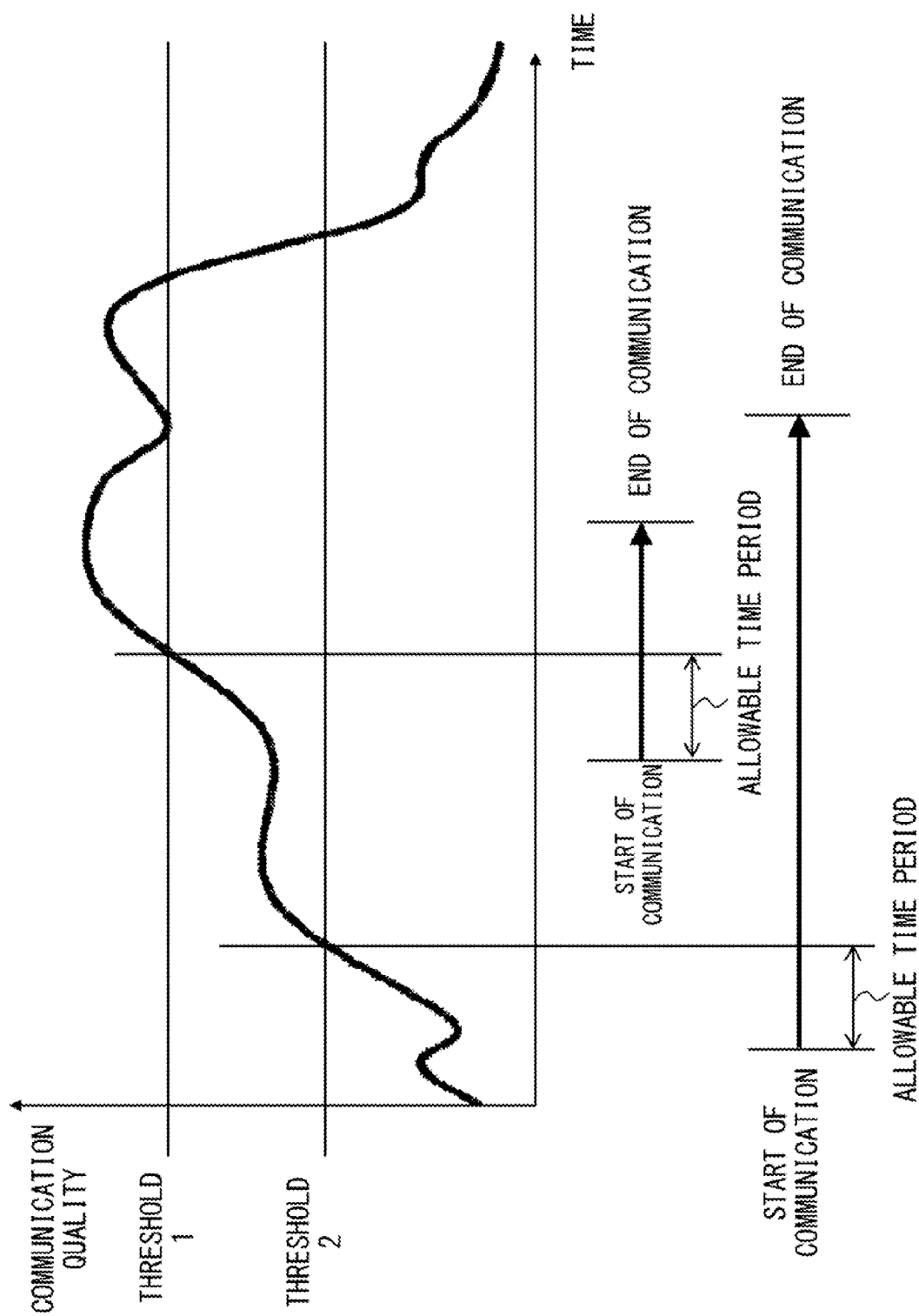
FIG. 10 illustrates an example of the communication quality in a UE to explain the second embodiment.

The content server according to the second embodiment is described with reference to FIG. 10.

In the first embodiment described above with reference to FIG. 9, a method to calculate the communication start time using the allowable time period set according to the data size of content data transmitted/received with the UE4 was described. In the second embodiment, the threshold regarding the communication quality is variable according to the data size transmitted/received with the UE 4. For example, as illustrated in FIG. 10, the communication start time calculator 114 sets the threshold to relatively high threshold 1 when the data size to transmit/receive is relatively small. On the other hand, the communication start time calculator 114 sets the threshold to relatively low threshold 2 when the data size to transmit/receive is relatively large.

By changing the threshold as described above, it becomes possible to set the starting time and the ending time of communication according to the data size to be transmitted/received. For this reason, substantially the same effect as in the first embodiment described above may be obtained.

Third Embodiment

The third embodiment of the content server 1 is described with reference to FIG. 11.

In the third embodiment, real time data such as streaming video is transmitted from the content server 1 to the UE 4. In non-real time content data transmission, the data size of the data is known in advance. On the other hand, in the distribution service of streaming video currently used, while the viewing time is fixed, content data of a plurality of patterns of data sizes with different image quality and the like according to the communication environment is prepared. For this reason, the data size to be transmitted in a unit time (in other words, the transmission data rate) changes according to the image quality and the like.

The communication start time calculator 114 prepares a plurality of different thresholds of communication quality according to the image quality of content data and the like, in order to calculate the communication start time for such real time content data.

Figure 11:
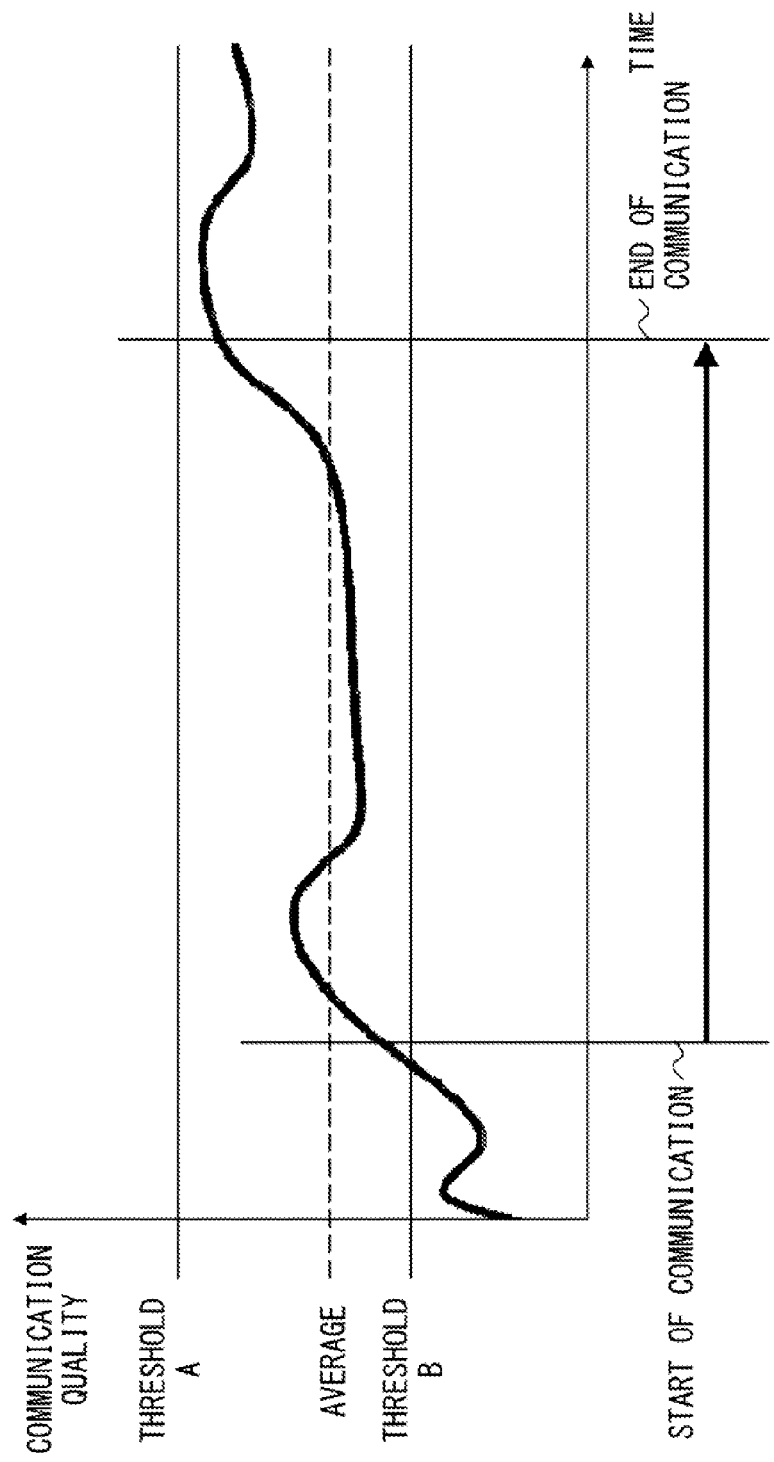
FIG. 11 illustrates an example of the communication quality in a UE to explain the third embodiment.

Regarding the third embodiment, description is made with reference to FIG. 11 with an example of streaming video distribution service where content data A whose image quality is relatively high (in other words, whose transmission data rate is high) and content data B whose image quality is relatively low (in other words, whose transmission data rate is low) exist.

The communication start time calculator 114 calculates the average communication quality in the prediction result of the communication quality until time $T_1$. In addition, the communication start time calculator 114 sets a plurality of patterns (two patterns in the example in FIG. 11) of thresholds for the average communication quality. In the example in FIG. 11, two thresholds, namely a relatively high threshold A corresponding to the content data A and a relatively low threshold B corresponding to the content data B are set. Such thresholds are determined so that, for the respective corresponding content data, transmission can be performed without discontinuation in playback (in other words, so as to satisfy the transmission data rate requested for the respective content data).

The communication start time calculator 114 detects the time section in which the average communication quality in the UE 4 exceeds the threshold A regarding the content data A whose image quality is relatively high, and calculates the time that is closest to the current time as the communication start time. Meanwhile, if the use of the content data B with a low image quality is allowed by user, the time section in which the average image quality exceeds the threshold B is detected, and the time that is closest to the current time as the communication start time is calculated.

Thus, according to the described matters, the communication start time calculator 114 can calculate a preferable communication start time for transmission of real time content data such as streaming video. Therefore, the streaming video can be played back without discontinuation.

Fourth Embodiment

In the fourth embodiment, the communication start time calculator 114 may set the timing of communication start so that communication starts with the arrival of the UE 4 at a specified position as a trigger, instead of the communication start time calculated based on the prediction of the moving route of the UE 4. For example, the communication start time calculator 114 may use specified position information on a map as a condition to start communication.

According to the fourth embodiment, even in a case in which the UE 4 moves a different speed than the estimation result of the moving route, the communication start time is corrected according to the moving status. For this reason, it becomes possible to start communication at a preferable position determined in the prediction of the communication quality, regardless of the moving speed and the like of the UE 4.

Fifth Embodiment

The fifth embodiment of the content server 1 is described with reference to FIG. 12 and FIG. 13.

When there are a plurality of UEs 4 to be the correspondent node in the radio communication system 10, the communication start time calculator 114 calculates an individual communication start time for each of the UE 4. However, when the number of UE 4 for which the communication start time is to be calculated increases, there arises a possibility that the time period to pass the same position on which the communication quality is preferable may overlap between a plurality of UEs 4. At this time, if the same communication start time is set for the plurality of UEs 4, it leads to contention between radio resources in the radio base station 3 that includes the same position on which the communication quality is preferable in its cell, and the communication quality may deteriorate.

Figure 12:
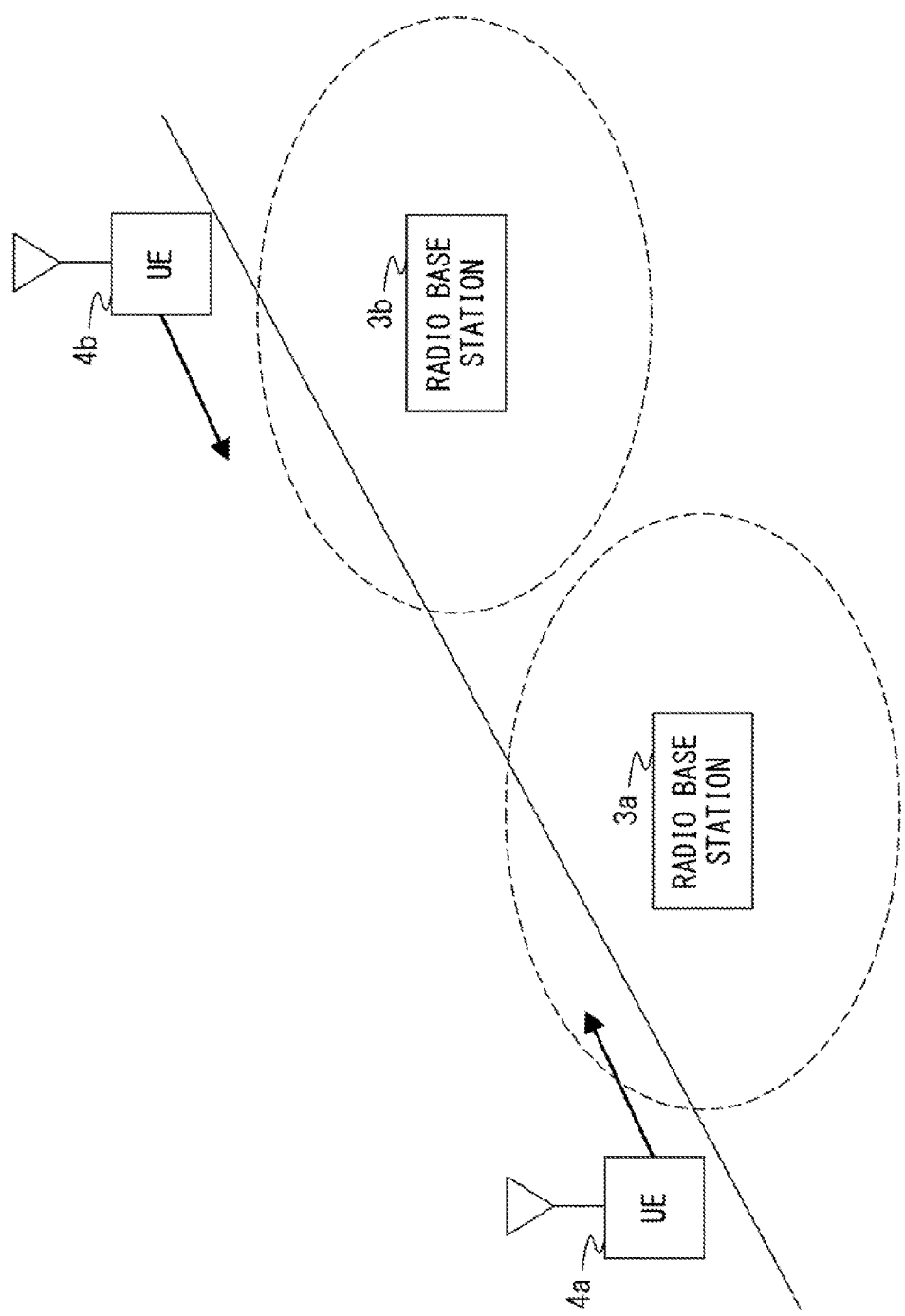
FIG. 12 illustrates moving routes of a plurality of UE.

FIG. 12 is a diagram illustrating an example of such a case, and illustrates a state in which the UE 4a and the UE 4b are respectively moving along different routes. The cell of the radio base stations 3a and 3b exist on the routes of the UE 4a and the UE 4b.

FIG. 13 illustrates the communication quality along the moving route of the UE 4a in the state illustrated in FIG. 12. The UE 4a passes through the respective cells of the radio base stations 3a and 3b sequentially along the movement. For this reason, the communication quality in the UE 4a once goes up when passing through the cell of the radio base station 3a, and goes down when passing the cell boundary between the radio base stations 3a and 3b, and after that, goes up again when passing through the cell of the radio base station 3b. Here it is assumed that in the time period in which the UE 4a passes through the cell of the radio base station 3a, the UE 4b also passes through the cell of the radio base station 3a, and the communication start time of the UE 4b has been already assigned regarding the time period. At this time, communication between the content server 1 and the UE 4b is performed through the radio base station 3a.

In this case, if it is predicted that the time period in which the UE 4a passes through the cell of the base station 3a overlaps the time period for the UE 4b in which the radio resource of the base station 3a has been allocated to the UE 4b, the communication start time calculator 114 calculates the communication start time of the UE 4a excluding that time period for the UE 4b. Specifically, the period time in which the UE 4a passes through the cell of the radio base station 3a is regarded as an exclusion period, and the start time and the end time are set so that the communication period does not overlap with the exclusion period. In the example of FIG. 13, the time period in which the UE 4a passes through the cell of the radio base station 3b is calculated as the communication start time of the UE 4a.

In the process described above, since the content server 1 knows the current position and the communication start time of each of the UE 4a and 4b, scheduling of the communication time of each UE may be performed without communicating new information.

In implementing the fifth embodiment, it is preferable that the communication quality information storage 123 has, in addition to the communication quality according to position information, information to identify the radio base station 3 to communicate at the position.

According to the fifth embodiment of the content server 1, when a plurality of users use the radio communication system 10, it becomes possible to make adjustment so that the communication time of the users in a particular communication section does not overlap. For this reason, it becomes possible to perform a more effective scheduling without contention of radio resources in the radio base station 3.

Sixth Embodiment

The sixth embodiment of the content server 1 is described with reference to FIG. 14.

In a case in which the data size of content data to be transmitted to the UE 4 is very large, it is possible that the allowable time period according to the data size becomes long, and the communication period of the content data becomes long. In such a case, it may become difficult to set a communication start time with which the transmission of the content data is completed in a single communication.

In the sixth embodiment of the content server 1, in a case in which the communication period is predicted to be very long, such as when the data size of content data is very large, the communication period is divided.

For example, as illustrated in FIG. 14, the threshold of the communication quality is set according to the data size, the time period in which the communication quality becomes equal to or above the threshold is regarded as the communication section, and communication is discontinued in the time period in which the communication quality falls below the threshold. According to the sixth embodiment as described above, even when the communication quality significantly changes in the moving route of the UE 4, it becomes possible to perform data transmission/reception at a position where the communication quality is preferable, making it possible to use radio resources effectively.

Other Embodiments

In the above embodiments, the content server 1 is described as an example of the communication controller. However, another network device may also be a preferable embodiment of the communication controller as long as it has functions corresponding to each functional unit described with reference to FIG. 2. For example, an RNC (Radio Network Controller) that is connected to one or more of radio base stations 3 and controls their operation may also be an embodiment of the communication controller. In addition, an MME (mobility management entity) that is connected to one or more of radio base stations 3 and performs the position registration of the UE 4, call processing or mobility management such as handover between radio base stations may also be an example of the communication controller. When such network devices are adopted as an embodiment of the communication controller, a similar operation as in each operation example described above may be realized by controlling communication of the device such as the content server that provides content data, according to the communication start time.

The present invention is not limited to the examples described above, and may be modified as needed within the scope that it is not against the gist or idea of the invention understood from the claims and specification as a whole, and a communication controller, method and a radio communication system and the like with such modification are also included in the technical scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A communication controller comprising a processor to perform a process of estimating a moving route of a mobile station connected through a network and a process of determining a timing to start transmission of data to be transmitted between the network and the mobile station based on a prediction result of a communication quality of the mobile station according to the estimated moving route and a size of the data, wherein
the processor determines the timing to start transmission of the data so that a time period required for transmission of the data between the network and the mobile station is shortest.

2. A communication controller comprising a processor to perform a process of estimating a moving route of a mobile station connected through a network and a process of determining a timing to start transmission of data to be transmitted between the network and the mobile station based on a prediction result of a communication quality of the mobile station according to the estimated moving route and a size of the data, wherein the processor (i) sets a threshold regarding the communication quality of the mobile station, and (ii) determines a timing to start transmission of the data as a closest timing from a current time among start timings of transmission with which a period in which the communication quality of the mobile station falls below the threshold is within a period determined according to the size of the data from start timing of transmission of the data until a timing on which transmission of the data is estimated, based on a size of the data and the prediction result of the communication quality, to be complete.

3. A communication controller comprising a processor to perform a process of estimating a moving route of a mobile station connected through a network and a process of determining a timing to start transmission of data to be transmitted between the network and the mobile station based on a prediction result of a communication quality of the mobile station according to the estimated moving route and a size of the data, wherein the processor (i) sets a threshold regarding the communication quality of the mobile station according to a size of the data, and (ii) determines a timing to start transmission of the data as a closest timing from a current time among start timings of transmission with which a period in which the communication quality of the mobile station falls below the threshold is within a specified period from start timing of transmission of the data until a timing on which transmission of the data is estimated, based on a size of the data and the prediction result of the communication quality, to be complete.

4. A communication controller comprising a processor to perform a process of estimating a moving route of a mobile station connected through a network and a process of determining a timing to start transmission of data to be transmitted between the network and the mobile station based on a prediction result of a communication quality of the mobile station according to the estimated moving route and a size of the data, wherein the processor (i) sets a threshold regarding an average of the prediction result of the communication quality of the mobile station, and (ii) determines a timing to start transmission of the data as a closest timing from a current time among start timings of transmission with which a period in which the average of the communication quality of the mobile station is equal to or higher than the threshold from start timing of transmission of the data until a timing on which transmission of the data is estimated to be complete.

5. The communication controller according to claim 4, wherein the processor prepares thresholds respectively for a plurality of data sets viewing time period of which being the same each other and size of which being different from each other depending on image quality, and determines a timing to start transmission of the data using the thresholds.

6. The communication controller according to claim 1, wherein the processor (i) sets a threshold regarding the communication quality of the mobile station according to a size of the data, and (ii) determines a timing to start and a timing to stop transmission of the data so as to transmit the data while the communication quality of the mobile station is equal to or higher than the threshold.

7. The communication controller according to claim 1, wherein the processor determines a timing to start transmission of the data as a timing at which the mobile station arrives at a position determined based on a data size to be transmitted between the network and the mobile station and the prediction result of the communication quality.

8. The communication controller according to claim 1, wherein the processor estimates a moving route of the mobile station of a plurality of the mobile stations, predicts the communication quality of the plurality of the mobile stations, and determines a timing to start transmission of the data for each of the plurality of the mobile stations so that contention of radio resources of the network does not occur among the plurality of the mobile stations.

9. A communication control method comprising:
estimating a moving route of a mobile station connected through a network;
predicting communication quality of the mobile station according to the estimated moving route; and
determining a timing to start transmission of data to be transmitted between the network and the mobile station according a size of the data and the prediction result of the communication quality so that a time period required for transmission of the data between the network and the mobile station is shortest.

10. A radio communication system including a network and a mobile station that perform radio communication and a communication controller that controls the radio communication, wherein
the communication controller comprises:
a first processor to perform a process of estimating a moving route of a mobile station, a process of determining a timing to start transmission of data to be transmitted between the network and the mobile station based on a prediction result of a communication quality of the mobile station according to the estimated moving route and a size of the data, and a process of transmitting information indicating the determined timing to start transmission of the data to the mobile station; and
the mobile station comprises:
a receiver to receive the information indicating the timing to start transmission of the data from the communication controller; and
a second processor to control start of transmission of the data according to an obtained information indicating the timing to start transmission of the data, wherein
the first processor determines the timing to start transmission of the data so that a time period required for transmission of the data between the network and the mobile station is shortest.

\* \* \* \* \*